US008308956B1

(12) United States Patent
Jamieson et al.

(10) Patent No.: US 8,308,956 B1
(45) Date of Patent: Nov. 13, 2012

(54) METHOD FOR MEMBRANE FLUID FILTRATION AND REMEDIATION (75) Inventors: Tom Jamieson, Willis, TX (US); Edward Beverly Moe, Willis, TX (US)

(73) Assignee: Tri-Flo International, Inc., Willis, TX (US)

( * ) Notice: Subject to any disclaimer, the term of this patent is extended or adjusted under 35 U.S.C. 154(b) by 0 days.

(21) Appl. No.: 12/949,914

(22) Filed: Nov. 19, 2010

Related U.S. Application Data (60) Provisional application No. 61/285,714, filed on Dec. 11, 2009.

(51) Int. Cl.
*B01D 15/00* (2006.01)
*B01D 21/02* (2006.01)
*B01D 43/00* (2006.01)
*C02F 1/56* (2006.01)

(52) U.S. Cl. ......... 210/693; 210/639; 210/723; 210/202

(58) Field of Classification Search .............. 210/638, 210/639, 704, 724, 202, 690, 693, 723; 209/268
See application file for complete search history.

(56) References Cited

U.S. PATENT DOCUMENTS

| | | | | |
|---|---|---|---|---|
| 1,328,522 A | * | 1/1920 | Jones | 196/110 |
| 2,135,589 A | * | 11/1938 | Monson | 507/259 |
| 2,994,432 A | * | 8/1961 | Schluter | 210/101 |
| 4,459,207 A | | 7/1984 | Young | |
| 4,474,254 A | | 10/1984 | Etter et al. | |
| 4,526,687 A | | 7/1985 | Nugent | |
| 4,915,174 A | * | 4/1990 | Berrod | 507/103 |
| 4,931,190 A | | 6/1990 | Laros | |
| 5,236,605 A | | 8/1993 | Warncke | |
| 5,244,579 A | * | 9/1993 | Horner et al. | 210/652 |
| 5,344,573 A | * | 9/1994 | Hill et al. | 210/768 |
| 5,601,659 A | * | 2/1997 | Rohrbacher | 134/10 |
| 5,626,748 A | | 5/1997 | Rose | |
| 5,853,583 A | | 12/1998 | Shah | |
| 6,110,382 A | | 8/2000 | Wiemers et al. | |
| 6,890,431 B1 | * | 5/2005 | Eades et al. | 210/195.1 |
| 7,727,389 B1 | | 6/2010 | Mallonee et al. | |
| 7,731,840 B1 | | 6/2010 | Mallonee et al. | |
| 2005/0139530 A1 | * | 6/2005 | Heiss | 210/85 |
| 2008/0135478 A1 | * | 6/2008 | Zuback et al. | 210/638 |
| 2009/0211974 A1 | * | 8/2009 | Bonnelye et al. | 210/636 |

FOREIGN PATENT DOCUMENTS

WO  WO2007028894 A1 * 3/2007

* cited by examiner

*Primary Examiner* — Walter D Griffin
*Assistant Examiner* — Denise R Anderson
(74) *Attorney, Agent, or Firm* — Buskop Law Group, PC; Wendy Buskop (57) ABSTRACT

A method for membrane fluid filtration and remediation is described herein. The method can include flowing a slurry into a scalping shaker and separating a first particulate from the slurry, forming a first effluent. Free oil can be removed from the first effluent using a first weir, forming a cleaned effluent that can be discharged using a second weir. The cleaned effluent can flow through an absorbent material disposed over a circulation tank for removing more free oil from the cleaned effluent, forming a circulation effluent. A sludge can settle from the circulation effluent within the circulation tank, forming a cleaned circulation stream. The cleaned circulation stream can flow through an ultra-filtration membrane which can separate the cleaned circulation stream, forming a clean permeate and a dirty concentrate. The dirty concentrate can flow back to the circulation tank for further processing.

9 Claims, 6 Drawing Sheets

METHOD FOR MEMBRANE FLUID FILTRATION AND REMEDIATION

CROSS REFERENCE TO RELATED APPLICATIONS

The present application claims priority and the benefit of co-pending U.S. Provisional Application Ser. No. 61/285,714 filed on Dec. 11, 2009, entitled "MEMBRANE FOR MEMBRANE FLUID FILTRATION AND REMEDIATION". This reference is incorporated herein in its entirety.

FIELD

The present embodiments generally relate to a method for membrane fluid filtration and remediation. The method can use a system that can be portable, modular, containerizable, and can be able to traverse conventional roadways without the need for special permits.

BACKGROUND

A need exists for an oil, water, and particulate filtration and remediation method that can produce a clean permeate using modular components.

A further need exists for an oil, water, and particulate filtration and remediation method that can produce a small footprint.

The present embodiments meet these and other needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a membrane fluid filtration and remediation method. Embodiments of systems usable with the membrane fluid filtration and remediation method can be portable, modular, containerizable, explosion resistant, or combinations thereof.

An embodiment of a system usable with the membrane fluid filtration and remediation method can include a quiet tank component, a circulation component, and a storage and filtration component. Each of which can be portable, modular, containerizable, explosion resistant, or combinations thereof.

The quiet tank component can have a first frame. The first frame can be moveable and can be a trailer frame having two parallel channel steel bars connected at a point with a trailer hitch. The first frame can include axels and wheels for ease of movement.

A scalping shaker can be disposed on the first frame. The scalping shaker can receive an initial slurry. An example of a shaker usable with the system can be those available from Tri-Flo International, Inc. of Willis, Tex.

In embodiments, the initial slurry can be produced water, waste water, or oily waste water. The initial slurry can be oil and water, water and another contaminate, oil and another fluid, or combinations thereof. The initial slurry can include various sized particulates.

For example, the membrane fluid filtration and remediation system can be used at waste disposal sites to produce a clean aqueous discharge.

The method can include flowing the initial slurry through the filtration system scalping shaker. The method can include using the filtration system scalping shaker to separate a first filtration particulate from the initial slurry and to form a first filtration effluent. The first filtration particulate can have a diameter of at least seventy microns. The method can include flowing the first filtration particulate from the filtration system scalping shaker to a cuttings box.

The method can include flowing the first effluent from the scalping shaker to a first tank.

A first pump, such as a centrifugal pump, can be used to pump the first effluent from the first tank into a second tank.

The second tank can have a first weir, which can be adjustable, which can be used to remove free oil from the first effluent and to form a cleaned effluent. The second tank can also have a second weir, which can also be adjustable, and can be used to discharge the cleaned effluent from the second tank. The first and second weirs can be in parallel.

The circulation component can include a second frame which can be moveable. The second frame can be a channel steel trailer frame supported by axels and wheels.

A circulation tank can be disposed on the second frame. The circulation tank can be in fluid communication with the second weir for receiving the cleaned effluent from the second tank. The method can include transferring the cleaned effluent from the second tank to the circulation tank, such as by using a hydrostatic pressure of the second tank.

Embodiments of the membrane fluid filtration and remediation method can include using a polymer injector for introducing polymer into the circulation tank or the second tank, or combinations thereof. The method can include shutting down the circulation component, the quiet component, or combinations thereof, and introducing the polymer into either or both of the tanks. In embodiments, the polymer can be a polyacrylamide.

The method can include blending the polymer with any clean effluent in the tanks, allowing for a fast and easy method for cleaning the tanks.

The introduced polymer can form a flocculated material when the polymer blends with the remaining clean effluent. The polymer can be injected through a feed transfer pipe into each tank. The feed transfer pipe can be used to circulate the flocculated material into the cleaned effluent remaining in the circulation tank, which can agitate the flocculated materials such that even small particles of oil can be captured by the polymer.

A static mixer can be in fluid communication with the circulation tank and the second tank. The method can include flowing the polymer through the static mixer. The method can include using the static mixer to blend the clean effluent with the polymer, which can form a cleaned stream and a first sludge.

An injection pump can be used to pressure feed the polymer from a polymer tank to the static mixer.

An absorbent material, such as a hydrocarbon absorbent material, can be disposed on the circulation component over the circulation tank. The absorbent material can be recyclable, pillow shaped, or combinations thereof.

The method can include flowing the clean effluent from the second tank to the circulation tank, passing the clean effluent through the absorbent material, and using the absorbent material to remove or filter free oil from the cleaned effluent, which can form a circulation effluent.

In embodiments, the free oil absorbed into the absorbent material can be removed, such as by applying pressure to the absorbent material; thereby allowing for recycling and continued use of the absorbent material.

The method can include allowing a sludge to settle out within the circulation tank and forming a clean circulation stream.

The storage and filtration component can be in fluid communication with the circulation component.

The method can include flowing the clean circulation stream from the circulation tank to the storage and filtration component. A discharge pump can be used to pump the clean circulation stream from the circulation tank to the storage and filtration component.

An ultra-filtration membrane can be disposed in the storage and filtration component. The ultra-filtration membrane can receive the clean circulation stream from the circulation tank. The ultra-filtration membrane can filter out particulates and other contaminates from the clean circulation stream, which can form a clean permeate and a dirty concentrate.

The dirty concentrate can be pumped or can otherwise flow back to the circulation tank for further processing. The clean permeate can be injected into a well to be used as a frac fluid, can be disposed of, or can be stored for later use.

The storage and filtration component can have a container. The container can be a standard shipping container, such as an eight feet and six inches by twenty feet shipping container. A third frame of the storage and filtration component can partially form the container. The third frame can have axels and wheels.

A control box can be disposed in or on the container and can be in communication with the quiet tank component, the circulation component, and the storage and filtration component.

The control box can be used to actuate and shut down the quiet tank component, the circulation component, and the storage and filtration component.

A heater can be disposed in the container for warming the container and preventing components of the container from freezing.

A power source, such as a generator, can be located proximate to the container for providing power to the quiet tank component, the circulation component, and the storage and filtration component. The power source can be in communication with the control box.

A cleaning system, such as a closed cell ball detergent cleaning system, can be disposed in the container and can be in fluid communication with the ultra-filtration membrane. The method can include shutting down the storage and filtration component and using the closed cell ball detergent cleaning system to clean the ultra-filtration membrane. In embodiments, the cleaning system can be remotely actuated.

A storage area can be disposed in the container, allowing the storage and filtration component to act as a carrier of spare parts, tires, additional equipment, and other items.

Fluid communication can be provided between the quiet tank component, the circulation component, and the storage and filtration component for operation at a work site. When work is completed at the work site, the fluid communication can be easily disconnected, allowing for transport of the components.

In embodiments, the circulation tank and the second tank can be cone shaped tanks In embodiments, a second injector can be in fluid communication with the circulation tank. The second injector can be used to introduce bentonite, barite, or a pH modifier to the circulation tank.

In one or more embodiments, the various pumps used with the components can be centrifugal pumps or vertical direct pumps.

In one or more embodiments, the components can be skid mounted on the frames.

In one or more embodiments, the storage and filtration component can have one or more of the following: a handrail connected to the third frame, illuminating lights connected to the third frame and to the control box, a ladder connected to the third frame, and a pintel hitch connected to the third frame.

In one or more embodiments, a clean out hatch can be disposed on at least one of the various tanks of the system, providing access for cleaning the tanks.

Figure 1A:
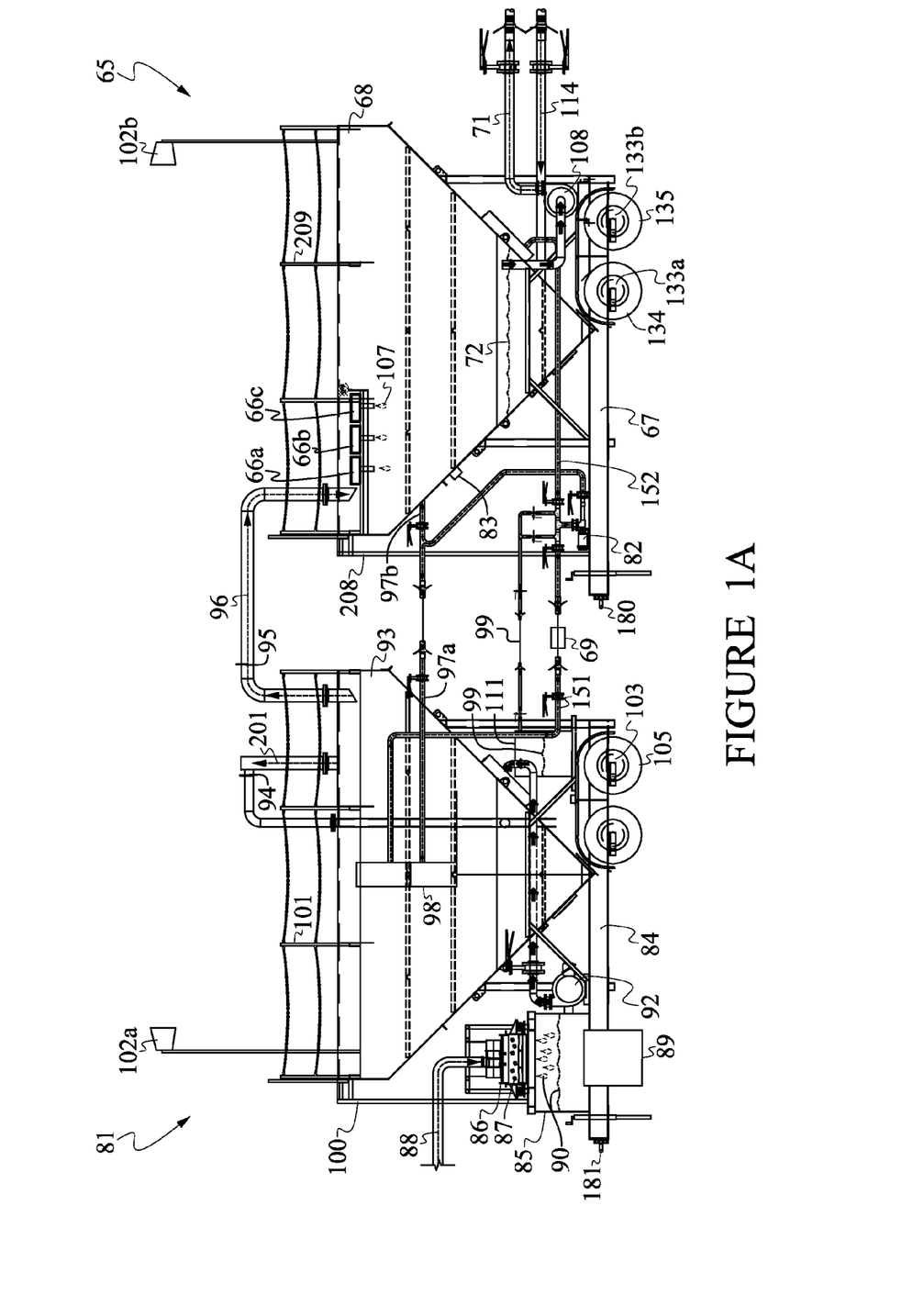
FIG. 1A is a side view of a circulation component and a quiet tank component.

Turning now to the Figures, FIG. 1A is a side view of the quiet tank component 81 and the circulation component 65.

The quiet tank component 81 is shown having a first frame 84 with a first hitch 181, depicted as a pintel hitch.

A filtration system scalping shaker 86 can be in fluid communication with a first tank 85. The filtration system scalping shaker 86 can receive an initial slurry 88. The filtration system scalping shaker 86 can separate a first filtration particulate 87 from the initial slurry 88, forming a first filtration effluent 90.

The first filtration effluent 90 can contain some oil and some particulate of a smaller diameter than the first filtration particulate 87.

The first filtration particulate 87, which can have a diameter of at least seventy microns, can flow to a cuttings box 89. The first filtration effluent 90 can flow from the filtration system scalping shaker 86 into the first tank 85.

A first filtration pump 92 can be in fluid communication with the first tank 85. The first filtration pump 92 can pump the first filtration effluent 90 from the first tank 85 into a second tank 93. The first filtration pump 92 can be a centrifugal pump.

The second tank 93 can receive the first filtration effluent 90. The second tank 93 can process the first filtration effluent 90 through a first adjustable weir 94. The first adjustable weir 94 can remove free oil 201 from the first filtration effluent 90. A second adjustable weir 95, which can be in parallel with the first adjustable weir 94, can be used to discharge a cleaned effluent 96 from the second tank 93.

The quiet tank component 81 is also shown having a first handrail 101, a first illuminating light 102a, a first ladder 100, a first axel 103, and a first wheel 105.

The circulation component 65 can have a circulation tank 68. The circulation tank 68 can be in fluid communication with the second adjustable weir 95. The circulation tank 68 can receive the cleaned effluent 96.

The cleaned effluent 96 can flow from the second adjustable weir 95 to a plurality of absorbent materials 66a, 66b, and 66c disposed over the circulation tank 68. The plurality of absorbent materials 66a-66c can remove free oil therefrom, forming a circulation effluent 107. The circulation effluent 107 can flow into the circulation tank 68.

The circulation component 65 is shown having a second frame 67, a second illuminating light 102b, a second handrail 209, a second ladder 208, a second hitch 180, a clarifier first axel 133a, a clarifier second axel 133b, a clarifier first wheel 134, and a clarifier second wheel 135.

A sludge 72 can settle from the circulation effluent 107 within the circulation tank 68, forming a clean circulation stream 71.

The circulation component 65 can include a discharge pump 108, which can be a centrifugal pump. The discharge pump 108 can be in fluid communication with the circulation tank 68. The discharge pump 108 can pump the clean circulation stream 71 from the circulation tank 68 to the storage and filtration component.

As the discharge pump 108 pumps the clean circulation stream 71 from the circulation tank 68 to the storage and filtration component, the discharge pump 108 can cause the circulation effluent 107 to circulate within the circulation tank 68. The circulation of the circulation effluent can cause the sludge 72 to settle, thereby forming the clean circulation stream 71.

The circulation tank 68 is shown receiving a dirty concentrate 114 from the storage and filtration component for repeated treatment of fluid in the circulation tank 68.

A second injector 83 is shown in fluid communication with the circulation tank 68. The second injector 83 can be used to inject bentonite, barite, a pH modifier, or another material into the circulation tank 68.

During a shutdown of the circulation component 65 and the quiet tank component 81, a polymer 99 can be introduced to the second tank 93 and the circulation tank 68 from a polymer source 111 through ports 97a and 97b. The polymer 99 can blend with any remaining cleaned effluent 96 or circulation effluent 107, and can form flocculated materials 151 and 152. The flocculated materials 151 and 152 can flow from the second tank 93 and the circulation tank 68, can blend with the polymer 99, and can flow back into the second tank 93 and the circulation tank 68 for further cleaning.

A still pipe 98 can be disposed in the second tank 93. The still pipe 98 can facilitate the circulation of the polymer 99 and the flocculated materials 151 and 152 into the cleaned effluent 96 remaining in the second tank 93.

The circulation tank 68 and the second tank 93 can be in fluid communication with a static mixer 69. The static mixer 69 can facilitate blending within the each tank.

A polymer injector 82 can be used to introduce the polymer 99 into the circulation tank 68 and the second tank 93 under pressure.

Figure 1B:
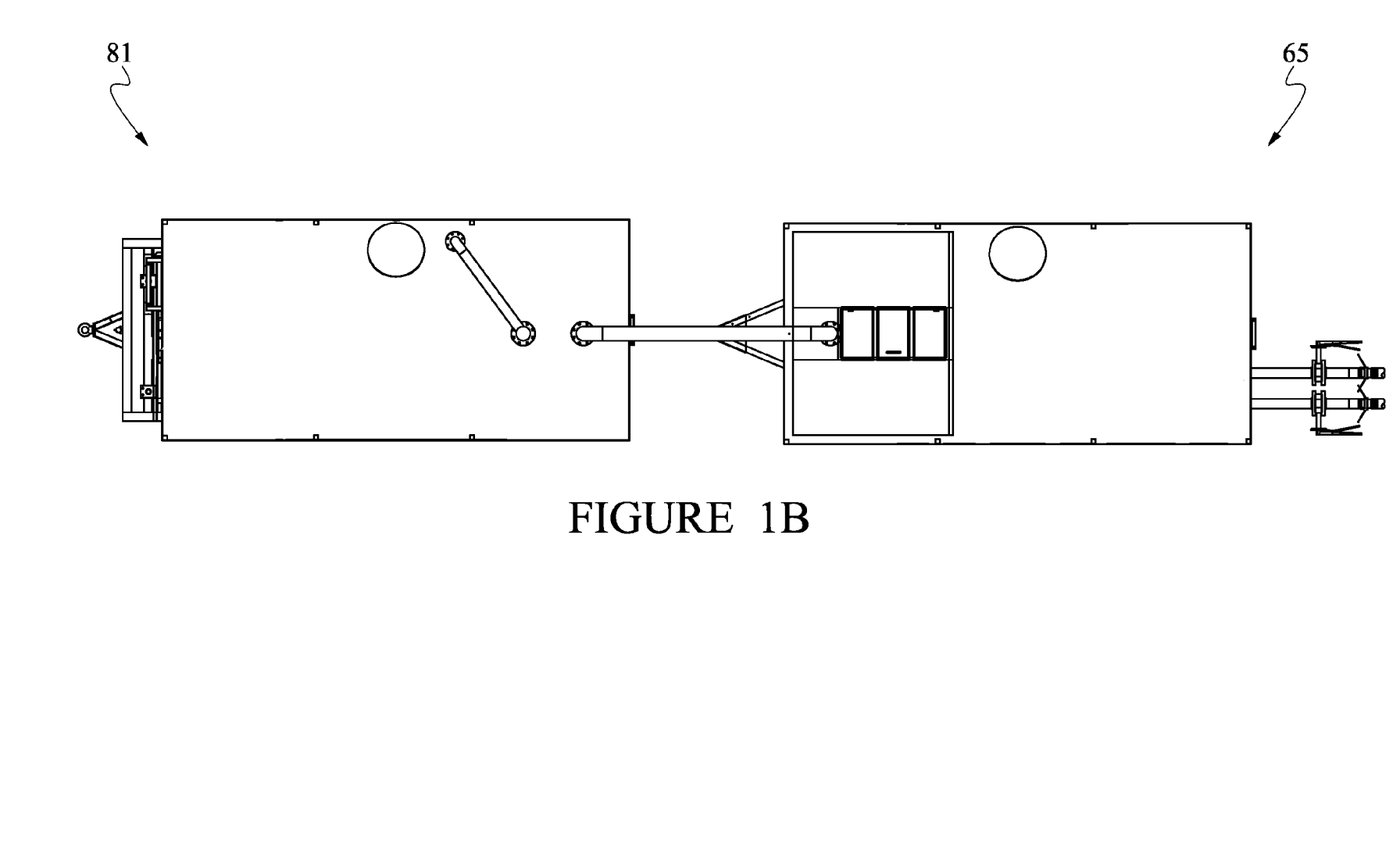
FIG. 1B is a top view of the circulation component and the quiet tank component.

FIG. 1B shows a top view of the quiet tank component 81 and the circulation component 65.

Figure 2:
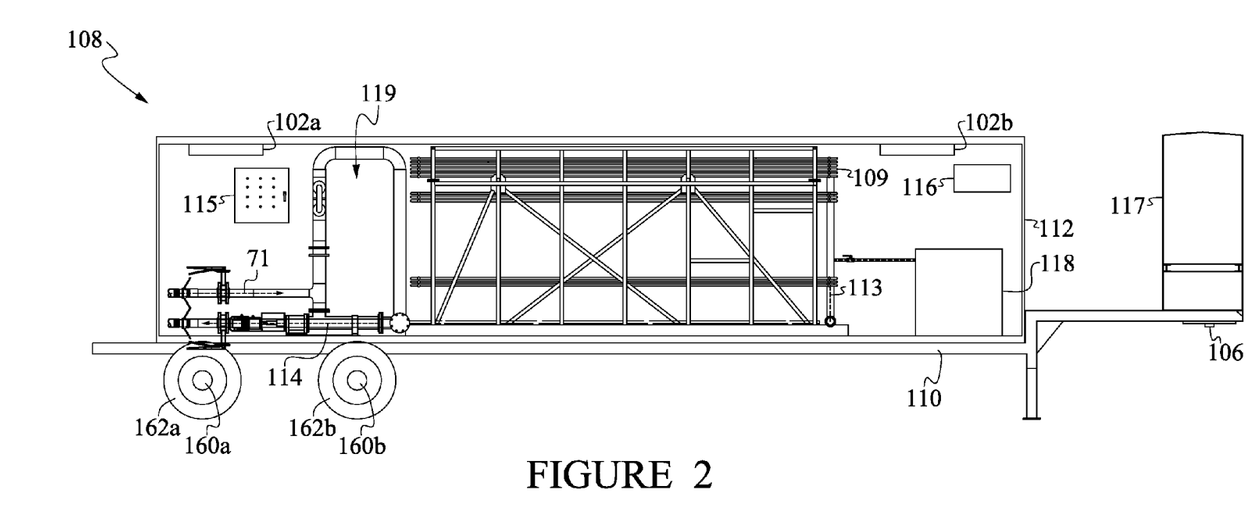
FIG. 2 is a side view of a storage and filtration component.

FIG. 2 shows a side view of the storage and filtration component 108.

The storage and filtration component 108 is shown with a container 112, which can be an explosion resistant container. The container 112 is shown partially formed by a third frame 110.

An ultra-filtration membrane 109 is shown disposed on the third frame 110 in the sides that form the container 112.

The storage and filtration component 108, which can be in fluid communication with the circulation tank, is shown receiving the clean circulation stream 71 from the circulation component.

The ultra-filtration membrane 109 can receive the clean circulation stream 71, and the ultra-filtration membrane 109 can separate the clean circulation stream 71 into a clean permeate 113 and a dirty concentrate 114. The dirty concentrate 114 can be pumped or can otherwise flow back to the circulation tank for further processing.

Also shown is a control box 115 which can be used to actuate and shut down the quiet tank component, the circulation component, and the storage and filtration component 108. The control box 115 can actuate or shut down the components in series, in pairs, or simultaneously.

A heater 116 is shown disposed in the container 112 for warming within the container 112.

A power source 117 is shown for operating the quiet tank component, the circulation component, and the storage and filtration component 108.

A closed cell ball detergent cleaning system 118 is shown disposed in the container 112 and in fluid communication with the ultra-filtration membrane 109. The closed cell ball detergent cleaning system 118 can be remotely actuated and can clean the ultra-filtration membrane 109 upon a shutdown of the storage and filtration component 108.

Also shown are a storage area 119, axels 160a and 160b, and wheels 162a and 162b. A kingpin 106 is shown that allows the storage and filtration component 108 to be towed by a tow vehicle.

Illuminating lights 102a and 102b are also shown.

Figure 3:
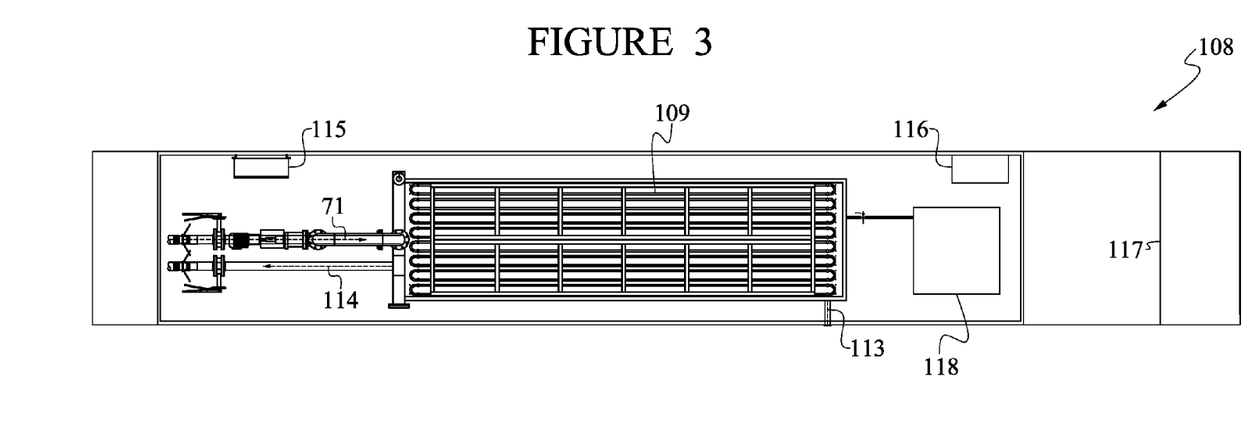
FIG. 3 is a top view of the storage and filtration component.

FIG. 3 is a top view of the storage and filtration component 108. The clean permeate 113, the cleaned circulation stream 71, the dirty concentrate 114, the control box 115, the heater 116, the power source 117, the closed cell ball detergent cleaning system 118, and the ultra-filtration membrane 109 are all shown.

Figure 4:
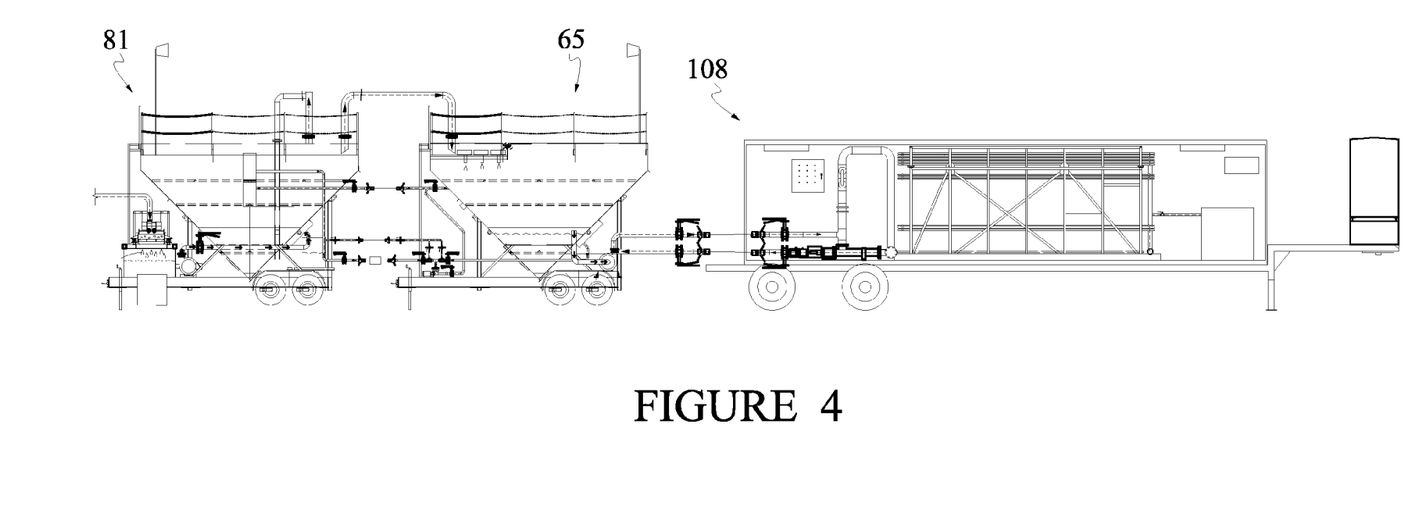
FIG. 4 is a side view of the circulation, quiet tank, and storage and filtration components assembled.

FIG. 4 is a side view of the quiet tank component 81, the circulation component 65, and the storage and filtration component 108 in fluid communication.

Figure 5A:
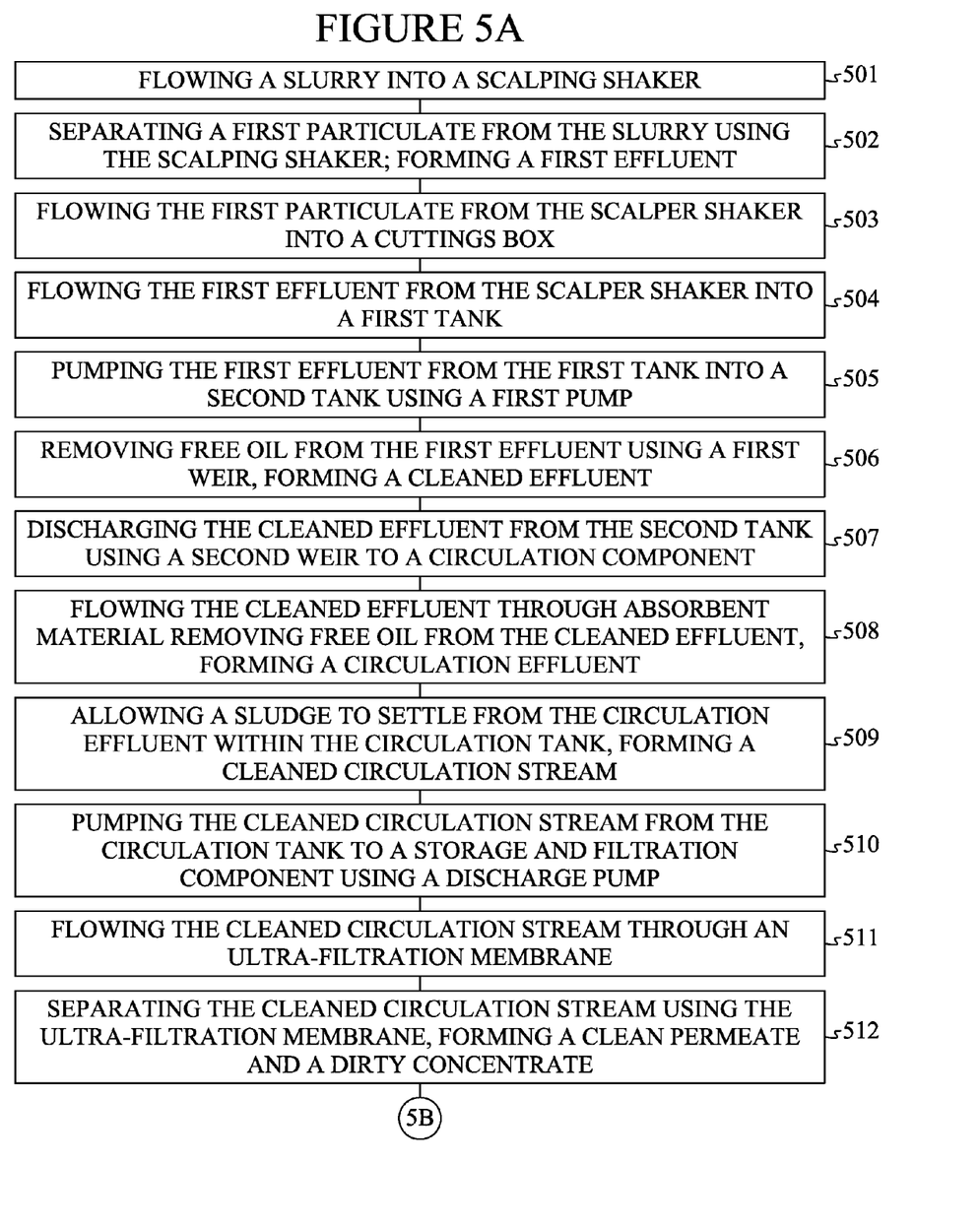
FIGS. 5A-5B depict a diagram of an embodiment of the method.

FIG. 5A is a diagram of an embodiment of the method that can be implemented using the system described herein.

Step 501 can include flowing a slurry into a scalping shaker.

Step 502 can include separating a first particulate from the slurry using the scalping shaker; forming a first effluent.

Step 503 can include flowing the first particulate from the scalper shaker into a cuttings box.

Step 504 can include flowing the first effluent from the scalper shaker into a first tank.

Step 505 can include pumping the first effluent from the first tank into a second tank using a first pump.

Step 506 can include removing free oil from the first effluent using a first weir, forming a cleaned effluent.

Step 507 can include discharging the cleaned effluent from the second tank using a second weir to a circulation component.

Step 508 can include flowing the cleaned effluent through absorbent material removing free oil from the cleaned effluent, forming a circulation effluent.

Step 509 can include allowing a sludge to settle from the circulation effluent within the circulation tank, forming a cleaned circulation stream.

Step 510 can include pumping the cleaned circulation stream from the circulation tank to a storage and filtration component using a discharge pump.

Step 511 can include flowing the cleaned circulation stream through an ultra-filtration membrane.

Step 512 can include separating the cleaned circulation stream using the ultra-filtration membrane, forming a clean permeate and a dirty concentrate.

Figure 5B:
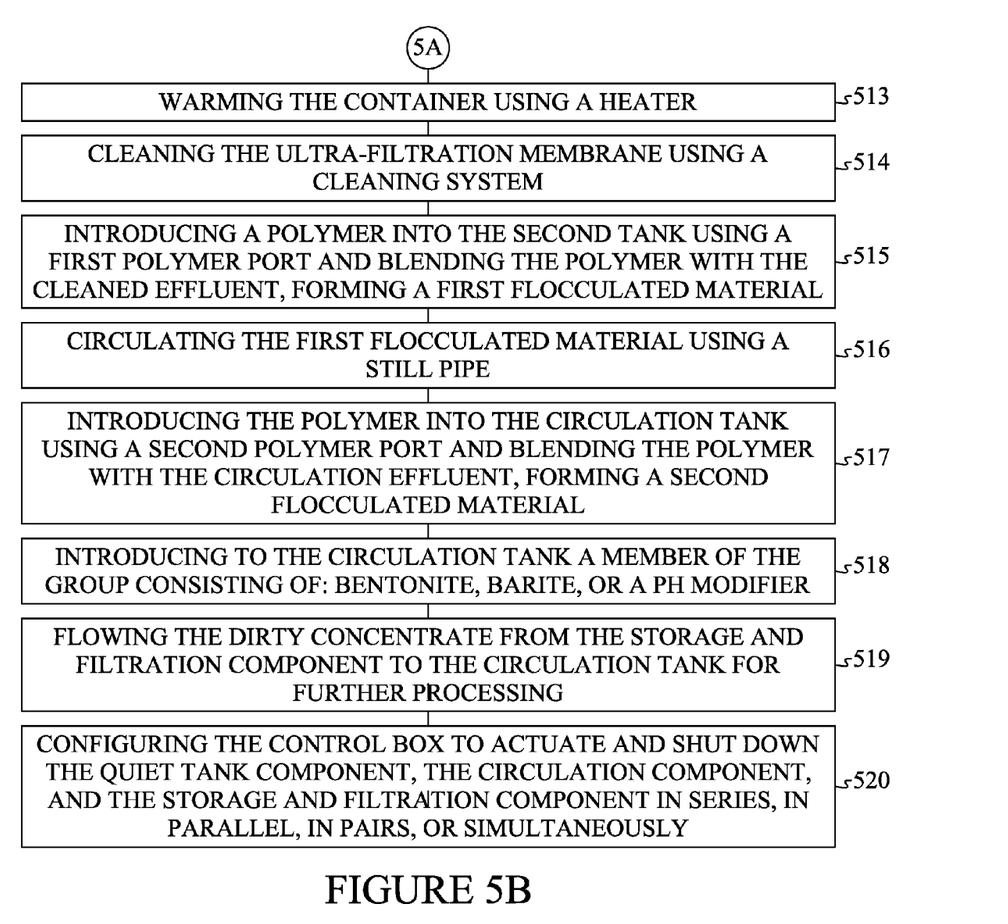

FIG. 5B is diagram that is a continuation of FIG. 5A.

Step 513 can include warming the container using a heater.

Step 514 can include cleaning the ultra-filtration membrane using a cleaning system.

Step 515 can include introducing a polymer into the second tank using a first polymer port and blending the polymer with the cleaned effluent, forming a first flocculated material.

Step 516 can include circulating the first flocculated material using a still pipe.

Step 517 can include introducing the polymer into the circulation tank using a second polymer port and blending the polymer with the circulation effluent, forming a second flocculated material.

Step 518 can include introducing to the circulation tank a member of the group consisting of: bentonite, barite, or a pH modifier.

Step 519 can include flowing the dirty concentrate from the storage and filtration component to the circulation tank for further processing.

Step 520 can include configuring the control box to actuate and shut down the quiet tank component, the circulation component, and the storage and filtration component in series, in parallel, in pairs, or simultaneously.

While these embodiments have been described with emphasis on the embodiments, it should be understood that within the scope of the appended claims, the embodiments might be practiced other than as specifically described herein.

The invention claimed is:

1. A method for fluid filtration and remediation, wherein the method comprises:
   a. introducing an initial slurry into a filtration system scalping shaker, wherein first filtration particulates are removed from the initial slurry forming a first filter effluent;
   b. passing the first filter effluent into a first tank in communication with a second tank, wherein the first filter effluent is pumped from the first tank to the second tank;
   c. removing free oil from the first filter effluent forming a cleaned effluent;
   d. using hydrostatic pressure in the second tank to pass the cleaned effluent to a circulation component;
   e. passing the cleaned effluent through a series of absorbent materials forming a circulation effluent wherein the series of absorbent materials are a recyclable hydrocarbon absorbent material comprising a plurality of pillow shaped materials that are squeezable for removing absorbed hydrocarbons;
   f. depositing the circulation effluent into a circulation tank and settling sludge out of the circulation effluent;
   g. passing the circulation effluent through a discharge pump, wherein the discharge pump comprises an inlet in fluid communication with the circulation tank and an outlet in fluid communication with an inlet of a filtration membrane;
   h. separating the circulation effluent into a clean permeate and a dirty concentrate;
   i. discharging the dirty concentrate from the filtration membrane and reintroducing the dirty concentrate into the circulation tank, wherein the introduction of the dirty concentrate into the circulation tank circulates circulation effluent in the circulation tank;
   j. discharging the clean permeate from the filtration membrane to an end use; and
   k. applying pressure to the series of absorbent materials to remove the free oil therefrom.

2. The method of claim 1, further comprising cleaning the filtration membrane using a cleaning system in fluid communication with the filtration membrane.

3. The method of claim 1, further comprising:
   a. introducing a polymer into the second tank using a first polymer port in fluid communication with the second tank; and
   b. blending the polymer with the cleaned effluent forming a first flocculated material.

4. The method of claim 3, wherein the polymer is a polyacrylamide.

5. The method of claim 3, further comprising circulating the first flocculated material using a still pipe disposed in the second tank.

6. The method of claim 3, further comprising:
   a. introducing the polymer into the circulation tank using a second polymer port; and
   b. blending the polymer with the circulation effluent forming a second flocculated material.

7. The method of claim 6, further comprising:
   a. blending the polymer within the second tank using a static mixer in fluid communication with the second tank; and
   b. introducing the polymer into the second tank and the circulation tank using a polymer injector.

8. The method of claim 1, further comprising introducing to the circulation tank a member of the group consisting of: bentonite, barite, and a pH modifier.

9. The method of claim 1, wherein pumping the first tank to the second tank is done using a first pump; wherein the first pump and the discharge pump are a centrifugal pump, a vertical direct pump, or combinations thereof.

* * * * *